United States Patent
De Paula Rosa Piga et al.

(10) Patent No.: US 11,886,224 B2
(45) Date of Patent: Jan. 30, 2024

(54) CORE SELECTION BASED ON USAGE POLICY AND CORE CONSTRAINTS

(71) Applicant: ADVANCED MICRO DEVICES, INC., Santa Clara, CA (US)

(72) Inventors: Leonardo De Paula Rosa Piga, Austin, TX (US); Karthik Rao, Austin, TX (US); Indrani Paul, Austin, TX (US); Mahesh Subramony, Austin, TX (US); Kenneth Mitchell, Austin, TX (US); Dana Glenn Lewis, Austin, TX (US); Sriram Sambamurthy, Austin, TX (US); Wonje Choi, Austin, TX (US)

(73) Assignee: Advanced Micro Devices, Inc., Santa Clara, CA (US)

(*) Notice: Subject to any disclaimer, the term of this patent is extended or adjusted under 35 U.S.C. 154(b) by 72 days.

(21) Appl. No.: 16/945,519

(22) Filed: Jul. 31, 2020

(65) Prior Publication Data

US 2021/0406092 A1 Dec. 30, 2021

Related U.S. Application Data

(60) Provisional application No. 63/044,533, filed on Jun. 26, 2020.

(51) Int. Cl.
*G06F 9/50* (2006.01)
*G06F 9/48* (2006.01)
*G06F 9/30* (2018.01)

(52) U.S. Cl.
CPC .............. *G06F 9/5027* (2013.01); *G06F 9/48* (2013.01); *G06F 9/4806* (2013.01);
(Continued)

(58) Field of Classification Search
CPC ........ G06F 9/48; G06F 9/4806; G06F 9/4843; G06F 9/4881; G06F 9/4893; G06F 9/50; G06F 9/5005; G06F 9/5011; G06F 9/5027; G06F 9/5033; G06F 9/5038; G06F 9/5044; G06F 9/5055; G06F 9/5094
See application file for complete search history.

(56) References Cited

U.S. PATENT DOCUMENTS 10,841,236 B1* 11/2020 Jin .......................... H04L 41/12
2005/0013705 A1 1/2005 Farkas et al.
(Continued)

FOREIGN PATENT DOCUMENTS

KR 10-2012-0031020 A 3/2012

OTHER PUBLICATIONS

Todri et al, "Power Supply Noise Aware Workload Assignment for Multi-Core Systems", IEEE, 2008, pp. 1-8 (Year: 2008).*
(Continued)

*Primary Examiner* — Charles M Swift

(57) ABSTRACT

A processing unit of a processing system compiles a priority queue listing of a plurality of processor cores to run a workload based on a cost of running the workload on each of the processor cores. The cost is based on at least one of a system usage policy, characteristics of the workload, and one or more physical constraints of each processor core. The processing unit selects a processor core based on the cost to run the workload and communicates an identifier of the selected processor core to an operating system of the processing system.

20 Claims, 5 Drawing Sheets

(52) U.S. Cl.
CPC .......... *G06F 9/4843* (2013.01); *G06F 9/4881* (2013.01); *G06F 9/4893* (2013.01); *G06F 9/50* (2013.01); *G06F 9/5005* (2013.01); *G06F 9/5011* (2013.01); *G06F 9/5033* (2013.01); *G06F 9/5044* (2013.01); *G06F 9/5055* (2013.01); *G06F 9/5094* (2013.01); *G06F 9/30098* (2013.01); *G06F 2209/5021* (2013.01)

(56) References Cited

U.S. PATENT DOCUMENTS

| | | | |
|---|---|---|---|
| 2011/0153893 A1 | 6/2011 | Foong et al. | |
| 2012/0150828 A1* | 6/2012 | Fablet .................... | G06F 9/505 707/693 |
| 2013/0205126 A1* | 8/2013 | Kruglick .............. | G06F 9/4405 713/1 |
| 2014/0149779 A1* | 5/2014 | Allen-Ware ........ | G06F 11/3051 713/340 |
| 2014/0359563 A1* | 12/2014 | Xie ........................ | G06F 8/451 717/106 |
| 2015/0178138 A1 | 6/2015 | Saha et al. | |
| 2015/0242243 A1* | 8/2015 | Balakrishnan .......... | G06F 1/329 718/104 |
| 2016/0253212 A1 | 9/2016 | Solihin | |
| 2016/0306673 A1* | 10/2016 | You ....................... | G06F 9/5044 |
| 2021/0109795 A1* | 4/2021 | Colombo .............. | G06F 9/4881 |

OTHER PUBLICATIONS

Manzak et al, "Low Power Design for DVFS Capable Software", 2019, IEEE, 978-1-7281-3885-5/19, pp. 1175-1179 (Year: 2019).*
International Search Report and Written Opinion dated Sep. 17, 2021 for PCT/US2021/038879, 10 pages.
International Preliminary Report on Patentability issued in Application No. PCT/US2021/038879, dated Dec. 13, 2022, 6 pages.

* cited by examiner

CORE SELECTION BASED ON USAGE POLICY AND CORE CONSTRAINTS

BACKGROUND

Modern processors include numerous processor cores for executing instructions in parallel. As the number of processor cores of a processor or system on a chip (SoC) increases, the processor cores tend to have a wider range of frequency response to infrastructure constraints such as voltage and temperature. For example, each processor core has a different minimum voltage at which it reaches a maximum frequency at a given temperature. In addition, variances in frequency response among processor cores can arise due to differences in microarchitecture or structure sizes of the processor cores. The heterogeneity of processor cores residing on an SoC means that each processor core has different energy efficiency and maximum operating frequency characteristics, in some cases on the order of hundreds of megahertz.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
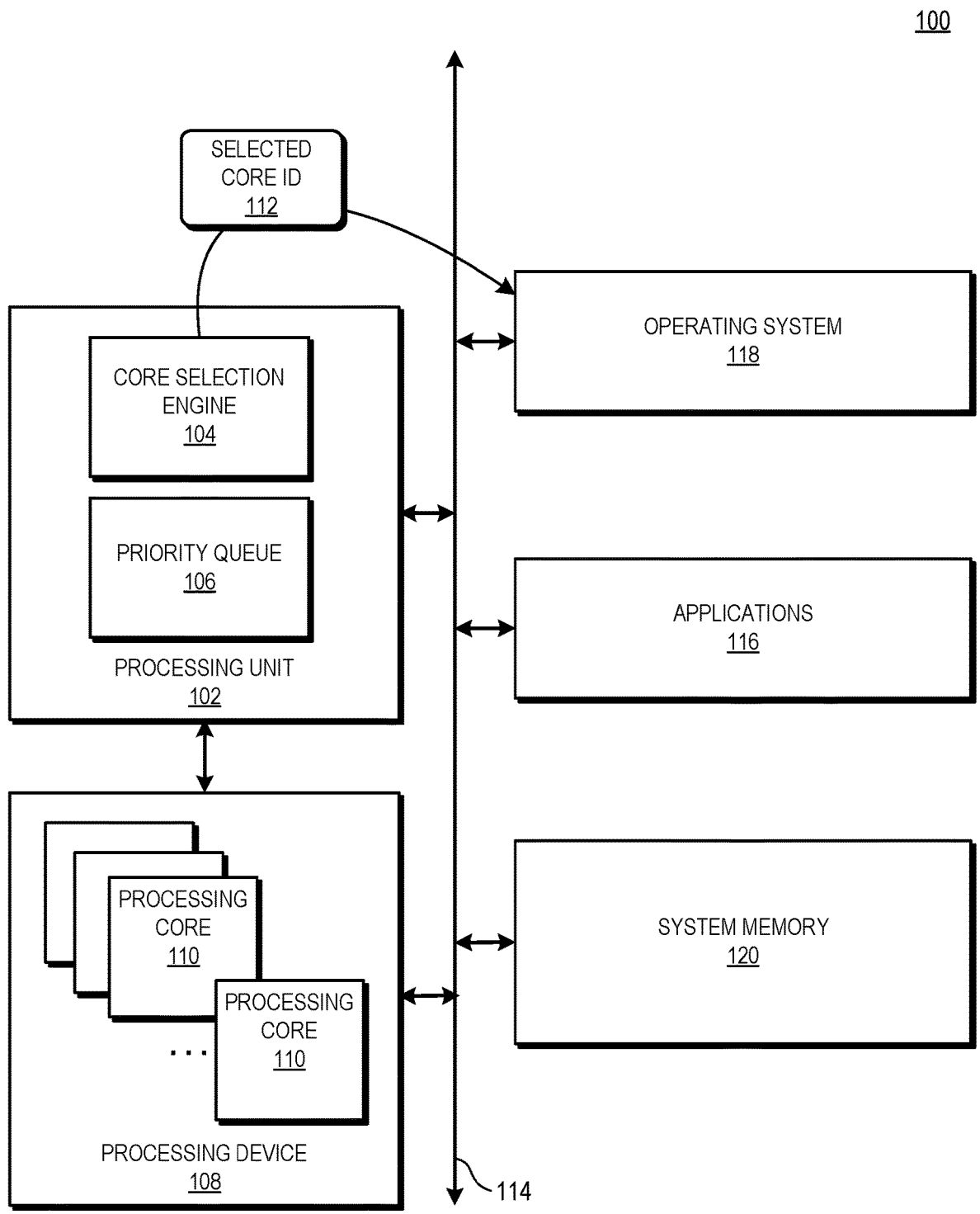
FIG. 1 is a block diagram of a processing system including a processing unit configured to provide a selected core identifier to an operating system in accordance with some embodiments.

FIGS. 1-5 illustrate systems and techniques for selecting a processor core (or set of processor cores) from a plurality of processor cores of a processing device to run workloads based on a range of system usage policies and constraints of the processor cores, such as, for example, a voltage to frequency response, and communicating the selected processor core to an operating system (OS). In response to receiving a request from the OS for a processor core to run a first workload, a processing unit of the processor, such as a central processing unit (CPU) or accelerated processing unit (APU), compiles a priority queue listing of processor cores to run the first workload based on a cost of running the first workload on each of the processor cores wherein the cost is based on, for example, a system usage policy, characteristics of the first workload, and one or more physical constraints of each processor core. The processing unit selects a processor core based on the cost to run the first workload and communicates an identifier of the selected processor core to the OS. In some embodiments, the processing unit writes the identifier of the selected processor core to a register from which the OS reads.

Once the processing unit communicates the identifier of the selected processor core to the OS, the processing unit removes, or pops, the selected processor core from the top of the priority queue while the OS utilizes the selected processor core to run the first workload. After the OS completes running the first workload on the selected processor core, the OS returns the selected processor core to the processing unit. The processing unit then calculates an updated cost for the selected processor core and reinserts the selected processor core into the priority queue at a position based on the updated cost.

The processing unit has access to low-level physical constraint parameter values of the processor cores and reduces the computational burden at the OS of determining which processor core to select to run a workload by maintaining a dynamically updated priority queue of the processor cores and communicating to the OS an identifier of the selected core to run each workload. The processing unit updates the priority queue in response to interrupt events, such as a change in the power mode of the processing system from alternating current (AC) to direct current (DC) or vice versa, as well as periodically. By selecting a processor core based on a current cost to run a workload and providing the selected processor identifier to the OS, as opposed to providing a static order of processor cores to the OS, the processing unit improves performance and energy efficiency of the processing system and reduces the computation load at the OS.

In some embodiments, if the OS requests another processor core to run a second workload while the selected processor is running the first workload, the processing unit updates the priority queue listing of processor cores (which at this point does not include the processor core that was selected to run the first workload) to run the second workload based on a cost of running the second workload on each of the processor cores. The cost is based on the current system usage policy, characteristics of the second workload, and one or more physical constraints of each processor core.

In some embodiments, the processing unit updates the priority queue periodically or based on interrupt events such as an updated system usage policy. The system usage policy changes dynamically based on, for example, whether a power supply for the processor is in an AC mode (i.e., operating off a connection to a power grid) or DC mode (operating off battery power source), or whether the current application involves high graphics intensity. The physical constraints of each processor core include such factors such as temperature, power, required voltage to reach a given frequency, reliability, required performance level, microarchitectural features, instructions per second, memory bandwidth, memory traffic in the memory controllers, and age.

Periodically, or in response to an interrupt such as an updated system usage policy or a new workload ready to be scheduled, the processing unit computes a cost of running the workload on each processor core based on the system usage policy and the physical constraints of each processor core. The processing unit sorts the processor cores in descending order of computed costs to compile the priority queue. Based on an updated priority queue based on current costs, the processing unit selects a core to fit a current usage policy for each workload.

FIG. 1 is a block diagram of a processing system 100 in accordance with some embodiments. The processing system 100 includes a processing unit 102 and a processing unit 108. In various embodiments, the processing unit 108 includes one or more single- or multi-core processor cores 110. The processing unit 102 includes a core selection engine 104 which generates a priority queue 106 of the processing cores 110 of the processing unit 108. The processing system 100 is generally configured to execute sets of instructions (e.g., computer programs) such as application 116 to carry out specified tasks for an electronic device. Examples of such tasks include controlling aspects of the operation of the electronic device, displaying information to a user to provide a specified user experience, communicating with other electronic devices, and the like. Accordingly, in different embodiments the processing system 100 is employed in one of a number of types of electronic device, such as a desktop computer, laptop computer, server, game console, tablet, smartphone, and the like. It should be appreciated that processing system 100 may include more or fewer components than illustrated in FIG. 1. For example, processing system 100 may additionally include one or more input interfaces, non-volatile storage, one or more output interfaces, network interfaces, and one or more displays or display interfaces.

As illustrated in FIG. 1, the processing system 100 also includes a system memory 120, an operating system 118, a communications infrastructure 114, and one or more applications 116. Access to system memory 120 is managed by a memory controller (not shown), which is coupled to memory 120. For example, requests from the processing unit 102 or other devices for reading from or for writing to system memory 120 are managed by the memory controller. In some embodiments, the one or more applications 116 include various programs or commands to perform computations that are also executed at the processing unit 102. The operating system 118 and the communications infrastructure 114 are discussed in greater detail below. The processing system 100 further includes a memory management unit, such as an input/output memory management unit (IOMMU) (not shown). Components of processing system 100 may be implemented as hardware, firmware, software, or any combination thereof. In some embodiments the processing system 100 includes one or more software, hardware, and firmware components in addition to or different from those shown in FIG. 1.

Within the processing system 100, the system memory 120 includes non-persistent memory, such as DRAM (not shown). In various embodiments, the system memory 120 stores processing logic instructions, constant values, variable values during execution of portions of applications or other processing logic, or other desired information. For example, in various embodiments, parts of control logic to perform one or more operations on processing unit 102 or the processing unit 108 reside within system memory 120 during execution of the respective portions of the operation by processing unit 102 or the processing unit 108. During execution, respective applications, operating system functions, processing logic commands, and system software reside in system memory 120. Control logic commands that are fundamental to operating system 118 generally reside in system memory 120 during execution. In some embodiments, other software commands also reside in system memory 120 during execution of processing system 100.

In various embodiments, the communications infrastructure 114 interconnects the components of processing system 100. Communications infrastructure 114 includes (not shown) one or more of a peripheral component interconnect (PCI) bus, extended PCI (PCI-E) bus, advanced microcontroller bus architecture (AMBA) bus, advanced graphics port (AGP), or other such communication infrastructure and interconnects. In some embodiments, communications infrastructure 114 also includes an Ethernet network or any other suitable physical communications infrastructure that satisfies an application's data transfer rate requirements. Communications infrastructure 114 also includes the functionality to interconnect components, including components of processing system 100.

The processing unit 102 includes (not shown) one or more of a control processor, field programmable gate array (FPGA), application specific integrated circuit (ASIC), or digital signal processor (DSP). The processing unit 102 executes at least a portion of the control logic that controls the operation of the processing system 100. For example, in various embodiments, the processing unit 102 executes the operating system 118 and the one or more applications 116. In some embodiments, the processing unit 102 initiates and controls the execution of the one or more applications 116 by distributing the processing associated with one or more applications 116 across the processing unit 102.

The processing unit 108 executes commands and programs for selected functions, such as graphics operations and other operations that are particularly suited for parallel processing. In general, processing unit 108 is frequently used for executing graphics pipeline operations, such as pixel operations, geometric computations, and rendering an image to a display. In some embodiments, processing unit 108 also executes compute processing operations (e.g., those operations unrelated to graphics such as video operations, physics simulations, computational fluid dynamics, etc.), based on commands or instructions received from the processing unit 102. For example, such commands include special instructions that are not typically defined in the instruction set architecture (ISA) of the processing unit 108. In some embodiments, the processing unit 108 receives an image geometry representing a graphics image, along with one or more commands or instructions for rendering and displaying the image. In various embodiments, the image geometry corresponds to a representation of a two-dimensional (2D) or three-dimensional (3D) computerized graphics image.

In various embodiments, the processing unit 108 includes one or more compute units, such as one or more processor cores 110 that include one or more SIMD units (not shown) configured to execute a thread concurrently with execution of other threads in a wavefront, e.g., according to a single-instruction, multiple-data (SIMD) execution model. The SIMD execution model is one in which multiple processing elements share a single program control flow unit and program counter and thus execute the same program but are able to execute that program with different data. Some embodiments of the processing unit 108 are used to implement a GPU and, in that case, the processing cores 110 are referred to as shader cores or streaming multi-processors (SMXs). The number of processing cores 110 that are implemented in the processing unit 108 is a matter of design choice. Each processing core 110 includes one or more processing elements such as scalar and/or vector floating-point units, arithmetic and logic units (ALUs), and the like. In various embodiments, the processing cores 110 also include special purpose processing units (not shown), such as inverse-square root units and sine/cosine units.

Each of processor cores 110 executes a respective instantiation of a particular work-item to process incoming data, where the basic unit of execution in the one or more processing cores 110 is a work-item (e.g., a thread). Each work-item represents a single instantiation of, for example, a collection of parallel executions of a kernel invoked on a device by a command that is to be executed in parallel. A work-item executes at one or more processing elements as part of a work-group executing at a processor core 110.

The processing unit 108 includes GPUs that issue and execute work-items including groups of threads executed simultaneously as a "wavefront" or "workload" on a single SIMD unit. Wavefronts may also be interchangeably referred to as warps, vectors, or threads. In some embodiments, wavefronts include instances of parallel execution of a shader program, where each wavefront includes multiple work-items that execute simultaneously on a single SIMD unit in line with the SIMD paradigm (e.g., one instruction control unit executing the same stream of instructions with multiple data). A scheduler (not shown) is configured to perform operations related to scheduling various wavefronts on different processor cores 110, as well as performing other operations for orchestrating various tasks on the processing unit 108.

The processor cores 110 have a range of physical constraints such as frequency response to infrastructure constraints such as voltage and temperature. The processor core physical constraints are subject to change based on system usage and from workload to workload. For example, if the temperature of a processor core 110 exceeds a threshold, the maximum frequency of the processor core 110 may be reduced and the reliability of the processor core 110 may be negatively impacted. Conversely, greater deep C-state residency tends to increase reliability of a processor core 110.

To improve performance, the processing unit 102 includes a core selection engine 104 that dynamically selects a core or set of cores to run each workload based on a cost and communicates the selected core to the OS 118. The core selection engine 104 has access to low-level physical constraint parameter values of the processor cores 110 such as power, temperature, required voltage to reach a given frequency, and reliability, and reduces the computational burden at the OS 118 of determining which processor core 110 to select to run a workload by maintaining a dynamically updated priority queue 106 of the processor cores 110 and communicating an identifier 112 of the selected core 110 to run each workload to the OS 118.

To illustrate, in operation, the processing unit 102 receives a request from the OS 118 for a processor core to run a workload. The core selection engine 104 determines a cost of running the workload at each of the processor cores 110 based on a cost function that considers one or more of a current system usage policy, physical constraints of each of the processor core 110, and characteristics of the workload. The core selection engine 104 compiles a priority queue 106 listing the processor cores 110 in an order based on the computed cost of running the workload at each of the processor cores 110. The core selection engine 104 selects a processor core from the priority queue 106 to run the workload and communicates an identifier 112 of the selected core to the OS 118. For example, in some embodiments, the cost function correlates a higher cost with higher suitability to run the workload given the current system usage policy, and the core selection engine 104 selects the processor core having the highest cost.

In some embodiments, the request from the OS 118 for a processor core to run a workload includes an indication that the workload has a low priority such as, for example, when the OS 118 is running a low priority background task. Because the priority queue 106 has already sorted the processor cores from most-performant to least-performant, the core selection engine 104 selects the processor core having the lowest cost in response to receiving an indication that the workload has a low priority.

Figure 2:
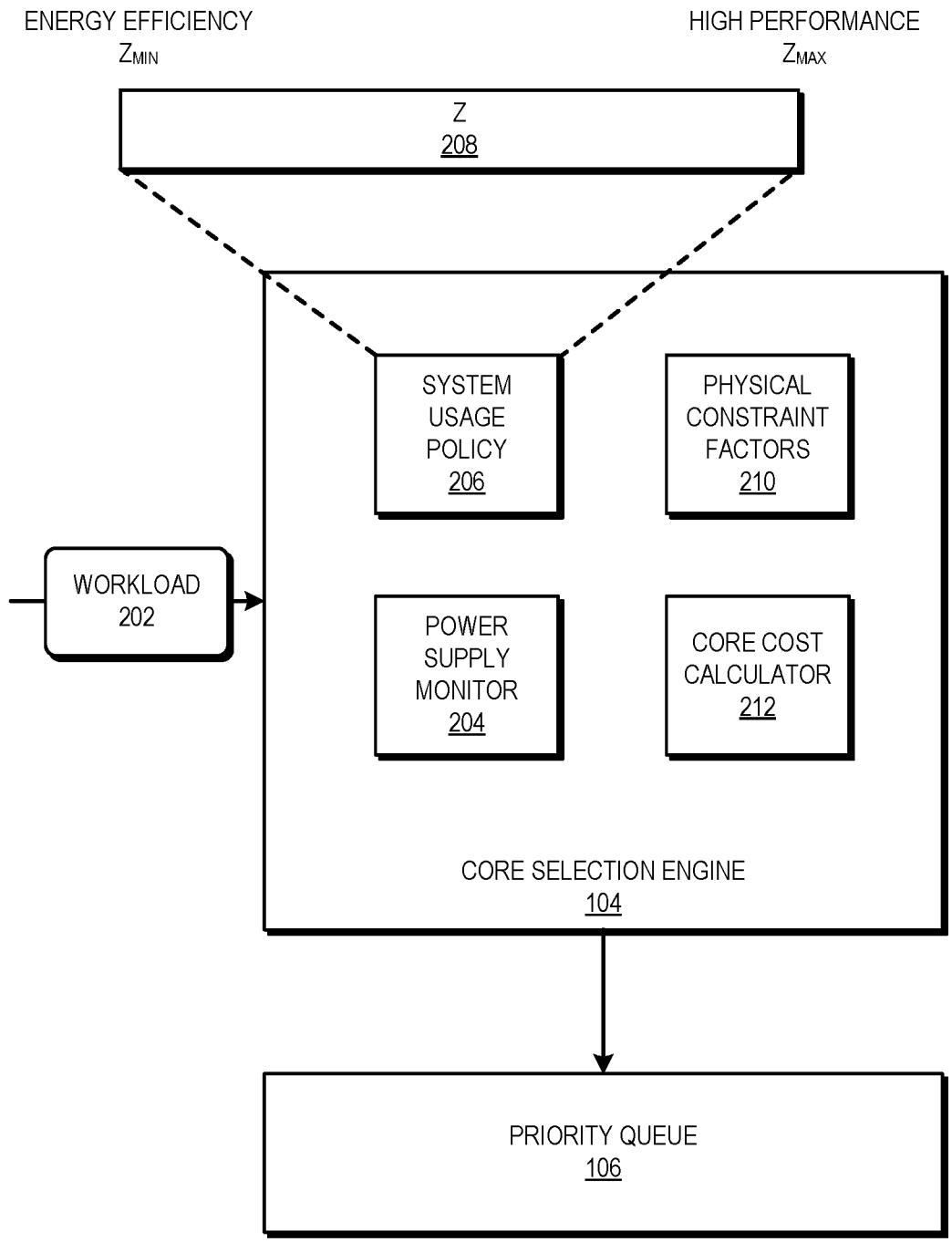
FIG. 2 is a block diagram of a core selection engine of the processing unit of FIG. 1 in accordance with some embodiments.

FIG. 2 is a block diagram of the core selection engine 104 of the processing unit 102 of FIG. 1 in accordance with some embodiments. The core selection engine 104 includes a power supply monitor 204, a system usage policy 206, processor core physical constraint factors 210, and a core cost calculator 212. The core selection engine 104 determines a cost of running a workload 202 on each processor core 110 (not shown) and compiles the priority queue 106 listing the processor cores 110 in descending cost order. The core selection engine 104 is implemented in hardware or in a microcontroller that runs power management firmware code. In some embodiments, the core selection engine 104 is implemented as hard-coded or programmable logic, one or more processors executing software/firmware instructions, or any combination thereof.

The power supply monitor 204 monitors whether the processing system 100 is in an AC or DC power mode. In some embodiments, the power supply monitor 204 further monitors a battery charge level when the processing system 100 is in a DC power mode. The power supply monitor 204 is implemented as hard-coded or programmable logic, one or more processors executing software/firmware instructions, or any combination thereof.

The system usage policy 206 is implemented in some embodiments as a trade-off parameter Z 208 having a fixed range $[Z_{min}, Z_{max}]$, wherein lower values are associated with higher battery mode/energy efficiency and higher values are associated with high performance. Thus, for example, in some embodiments the range of Z 208 is from 0 for battery mode/energy efficiency to 1 for high performance. The value of Z 208 is continuous in some embodiments and discretized in other embodiments. In some embodiments, the trade-off parameter Z 208 is adjustable by an end-user or by the OS 118. The system usage policy 206 receives an indication from the power supply monitor 204 when the power mode of the processing system 100 changes from AC to DC or vice versa, or when a battery charge level is below a threshold.

In some embodiments, the trade-off value Z 208 can be set according to a particular operating mode associated with a particular type of program or application executing at the processing system 100. For example, in some embodiments, the trade-off value Z 208 can be set to a value indicative of a "game mode." When the game mode value is selected by the end-user or OS 118, the core selection engine 104 selects a group of two or more cores (a core complex) that share an L3 cache and other resources that has best cost for the workload 202.

The physical constraint factors 210 is a repository of parameters for each workload and for each processor core 110 such as power, temperature, required performance level, required voltage to reach a certain frequency, reliability, and age, and system-wide microarchitecture events such as instructions per second, memory bandwidth, and memory traffic at the memory controller. In some embodiments, the physical constraint factors 210 include a detected minimum voltage to reach maximum frequency for each core at a given temperature. For embodiments in which the trade-off value Z 208 can be set to a game mode value, the physical constraint factors 210 include performance parameters for core complexes sharing L3 caches and other resources.

The core cost calculator 212 determines a cost for running the workload 202 at each processor core 110 for a given trade-off value Z 208. For example, in some embodiments the core cost calculator 212 determines the following cost for each core:

$$\text{Cost}(\text{Core0}) = f_{Core0}(X_1, X_2, \ldots, X_M, Z)$$

where $X_1$ and $X_2$ are parameters such as temperature, power, etc., and M is the total number of parameters used. More specifically, in some embodiments, the core cost calculator 212 determines a cost for each core using the following equation:

$$\text{Cost (Core0)} = \left(z \cdot \frac{\text{Power}_{Core0}}{\text{Power}_{MAX}}\right) + \left((1-z) \cdot \frac{\text{Perf}_{Core0}}{\text{Perf}_{MAX}}\right)$$

where $z \in [0,1]$ and $\text{Power}_{Core0}$ is the power consumption of Core0 and $\text{Perf}_{Core0}$ is the maximum achievable performance of Core0. $\text{Power}_{MAX}$ is the maximum power consumption value of all of the processor cores $$\text{Power}_{max} = \max(\text{Power}_{Core0}, \text{Power}_{Core1}, \ldots, \text{Power}_{CoreN-1})$$

and $\text{Perf}_{MAX}$ is the maximum performance value of all of the processor cores $$\text{Perf}_{max}(\text{Perf}_{Core0}, \text{Perf}_{Core1}, \ldots, \text{Perf}_{CoreN-1})$$

and both are known by the core cost calculator 212.

In some embodiments, the core cost calculator 212 employs a cost function that prioritizes low leakage for idling when the power supply monitor 204 indicates that the processing system 100 is operating in battery mode. In some embodiments, the core cost calculator 212 employs a cost function that considers processor core temperature and determines hotspots on the chip, as high temperature reduces the maximum frequency of a processor core 110 and affects reliability of the processor core 110. Similarly, higher operating voltage reduces reliability of processor cores 110, whereas greater deep C-State residency increases reliability. By employing a cost function that considers factors such as temperature, voltage, and deep C-state residency, the core cost calculator 212 computes a cost for each processor core 110 reflective of such conditions. In some embodiments, the core cost calculator 212 employs a cost function that considers a minimum voltage to reach maximum frequency for each processor core 110 at a given temperature, or processor core age based on aging counters. The core cost calculator 212 calculates the cost for each core in a similar manner and compiles a priority queue 106 for the processor cores 110 based on the cost of running the workload 202 at each processor core 110.

Figure 3:
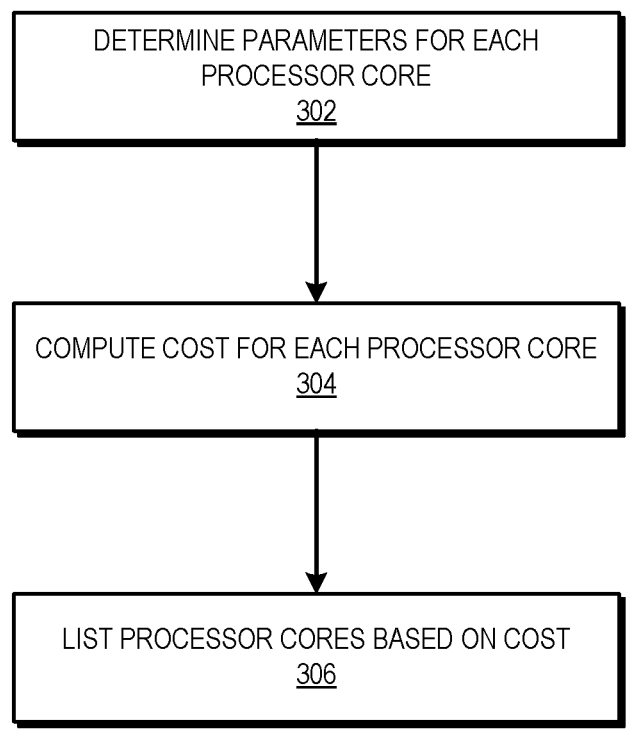
FIG. 3 is a flow diagram of a method of compiling a priority queue listing of processor cores to run a workload in accordance with some embodiments.

FIG. 3 is a flow diagram of a method 300 of compiling a priority queue 106 of processor cores 110 to run a workload in accordance with some embodiments. At block 302, the core selection engine 104 determines parameters for each processor core for running the workload. At block 304, the core cost calculator 212 computes a cost for each processor core 110 to run the workload based on the parameters stored at the physical constraint factors 210, the system usage policy 206 currently in effect, and characteristics of the workload. At block 306, the core selection engine 104 compiles the priority queue 106 listing the processor cores 110 based on their computed costs. In some embodiments, a higher cost correlates to a processor core that is more suited to run the workload, and the core selection engine 104 lists the processor cores 110 in descending order of cost.

The core selection engine 104 re-computes the cost for each processor core 110 and re-compiles the list of processor cores 110 for the priority queue 106 periodically. In some embodiments, the core selection engine 104 also re-computes the cost for each processor core 110 and re-compiles the list of processor cores 110 for the priority queue 106 in response to interrupt events such as receiving a request from the OS 118 for a processor core 110 to run a new workload, a change in the system usage policy 206, or an indication from the power supply monitor 204 of a change in power mode.

Figure 4:
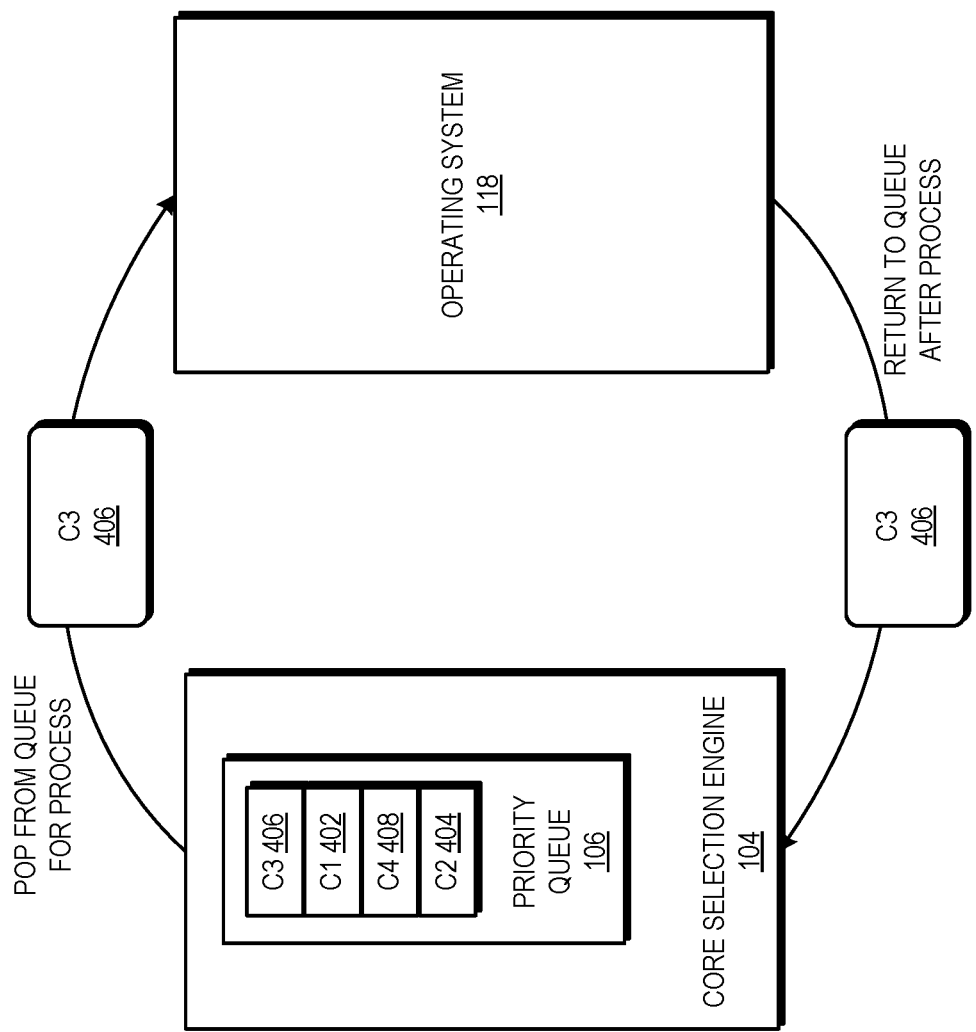
FIG. 4 is a block diagram of a core selection engine providing a selected core identification to an operating system in accordance with some embodiments.

FIG. 4 is a block diagram of the core selection engine 104 providing a selected core identification to the operating system 118 in accordance with some embodiments. The core selection engine 104 has compiled a priority queue 106 listing four processor cores in descending order of cost to run a workload based on an indication from the power supply monitor 204 of a power mode, the system usage policy 206 currently in effect based on a trade-off parameter Z 208 setting, physical constraint factors 210 for each processor core 110, and characteristics of the workload. In the illustrated example, the core selection engine 104 has listed a processor core C3 406 as the highest cost processor core to run the workload, processor core C1 402 as the second highest cost processor core to run the workload, processor core C4 408 as the third highest cost processor core to run the workload, and processor core C2 404 as the fourth highest cost processor core to run the workload.

In response to receiving a request from the OS 118 for a processor core to run the workload, the core selection engine 104 communicates an identifier of the processor core C3 406 to the OS 118 and pops (i.e., removes) the processor core C3 406 from the priority queue 106. In some embodiments, the core selection engine 104 communicates the identifier by writing the identifier to a register that is read by the OS 118. During the time the OS is utilizing the processor core C3 406 to run the workload, the priority queue 106 includes only the processor core C1 402 as the highest cost processor core, processor core C4 408 as the second highest cost processor core, and processor core C2 404 as the third highest cost processor core. If the OS 118 requests a second processor core, the core selection engine 104 communicates an identifier of the processor core C1 402 to the OS 118 and pops the processor core C1 402 from the priority queue 106, which now includes only processor core C4 408 and processor core C2 404.

When the OS 118 completes running the workload on the processor core C3 406, the OS 118 indicates to the core selection engine 104 that the workload has completed running at the processor core C3 406. In response to receiving the indication, the core selection engine 104 computes a new cost of running a next workload at the processor core C3 406 and reinserts the processor core C3 406 into the priority queue 106. In some embodiments, the core selection engine 104 determines a cost for each processor core in response to an interrupt event such as an updated system usage policy 206 or periodically.

In some embodiments, the request from the OS 118 for a processor core to run a workload includes an indication that the workload has a low priority such as, for example, when the OS 118 is running a low priority background task. In response to receiving a request for a processor core to run a low priority workload, the core selection engine 104 communicates an identifier of the lowest cost processor core, C2 404, to run the workload and removes the processor core C2 404 from the priority queue 106.

Figure 5:
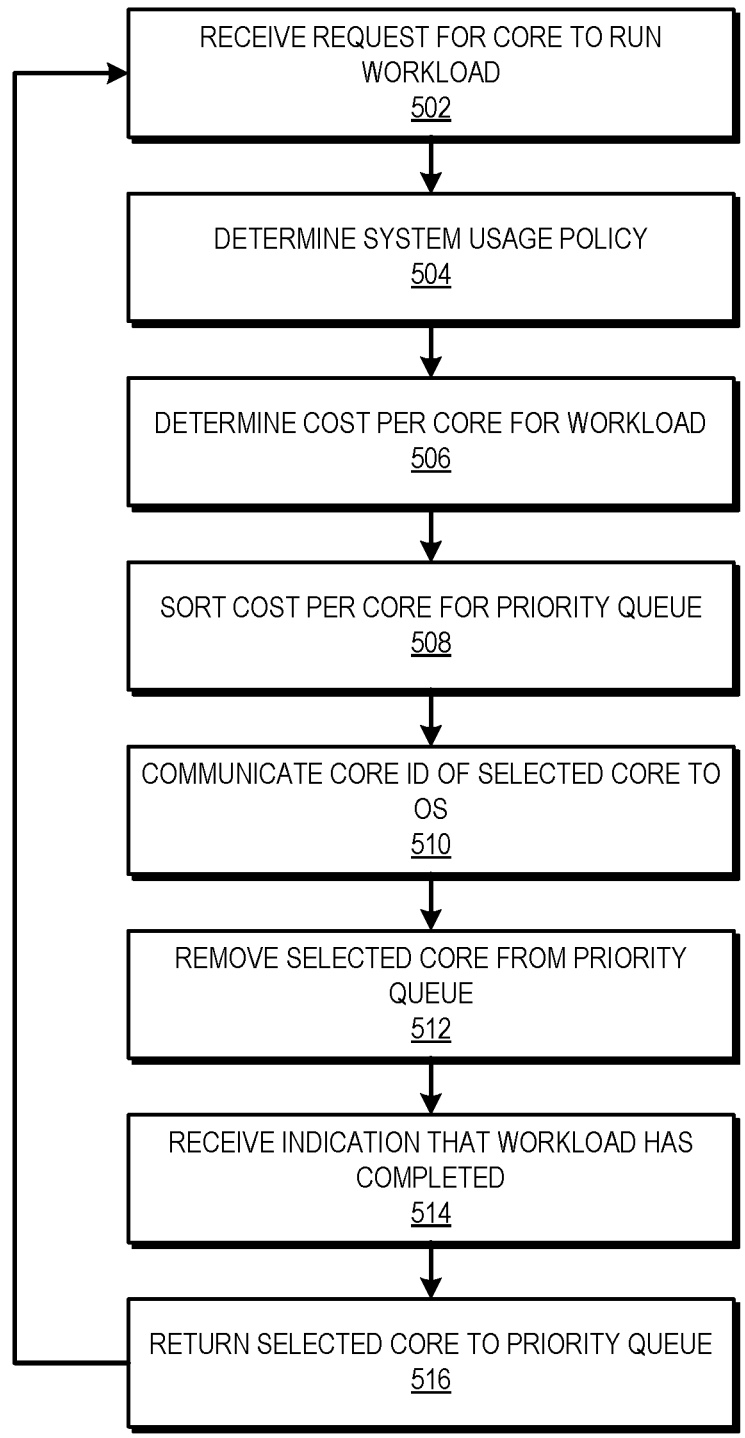
FIG. 5 is a flow diagram illustrating a method of providing a selected core identification from a processing unit to an operating system in accordance with some embodiments.

FIG. 5 is a flow diagram illustrating a method 500 of providing a selected core identification from a processing unit to an operating system in accordance with some embodiments. The method 500 is implemented in some embodiments of the processing unit 102 shown in FIG. 1 and the core selection engine 104 shown in FIG. 2.

At block 502, the processing unit 102 receives a request for a processor core for a workload from the OS 118. At block 504, the core selection engine 104 determines the system usage policy 206 based on a current value of the trade-off parameter Z 208. At block 506, the core cost calculator 212 applies a cost function to compute a cost for each processor core 110 to run the workload based on an indication from the power supply monitor 204 of a power mode, the system usage policy 206 currently in effect based on a trade-off parameter Z 208 setting, physical constraint factors 210 for each processor core 110, and characteristics of the workload.

At block 508, the core selection engine 104 compiles a priority queue 106 for the processor cores 110, sorting them based on the computed cost of running the workload at each processor core 110. In some embodiments, a higher cost correlates to a more suitable processor core for the workload, and the core selection engine 104 sorts the processor cores according to cost in descending order, such that the highest cost processor core is the first processor core in the priority queue 106. In some embodiments, if the power supply monitor 204 indicates that the processing system 100 is running DC mode (battery), the core selection engine 104 selects the processor core 110 with the lowest leakage for idling as the selected processor core.

At block 510, the core selection engine 104 communicates an identifier of the selected processor core for running the workload to the OS 118. In some embodiments, the core selection engine 104 writes the identifier of the selected processor core to a register that is read by the OS 118. Depending on the cost function applied by the core cost calculator 212, changing parameters or conditions such as a switch from AC to DC power mode trigger a re-calculation of the cost of running the workload at each processor core, resulting in a change to the selected processor core identifier communicated to the OS 118. In some embodiments, a communication of an updated selected processor core identifier to the OS 118 results in the OS 118 scheduling a new process or migrating current tasks to other cores.

At block 512, in response to communicating the identifier of the selected processor core to the OS 118, the core selection engine 104 removes the identified selected processor core from the priority queue 106 while the OS 118 runs the workload at the selected processor core. When the workload completes running at the selected processor core, the OS 118 indicates to the core selection engine 104 that the workload has completed. At block 514, the core selection engine 104 receives the indication from the OS 118 that the workload has completed running. At block 516, the core cost calculator 212 calculates a new cost for the selected processor core and the core selection engine 104 returns the selected processor core to the priority queue 106 at a position based on the new cost. The method flow then continues back to block 502 for the next workload.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:
1. A method comprising:
compiling a first priority queue of a plurality of processor cores of a processing system based on a first cost of running a first workload at each processor core of the plurality of processor cores, the first cost being based on physical constraints of each processor core;

selecting, at a processing unit of the processing system, a first processor core to run the first workload based on the first cost;

communicating an identifier of the first processor core to an operating system of the processing system; and in response to communicating the identifier of the first processor core to the operating system, removing the first processor core from the first priority queue.

2. The method of claim 1, wherein the first cost is based on at least one of a system usage policy, and characteristics of the first workload.

3. The method of claim 2, wherein the system usage policy is based on a trade-off between energy efficiency and performance.

4. The method of claim 2, further comprising:
updating the first cost in response to detecting a change in the system usage policy.

5. The method of claim 1,
wherein selecting comprises selecting a processor core having a highest first cost.

6. The method of claim 1, further comprising:
receiving an indication from the operating system that the first workload has a low priority; and
wherein selecting comprises selecting a processor core having a lowest first cost.

7. The method of claim 5, further comprising:
receiving a request from the operating system for a first processor core to run the first workload.

8. The method of claim 1, further comprising:
receiving, at the processing unit, an indication from the operating system that the first workload has completed running at the first processor core;
returning the first processor core to the first priority queue;
determining, at the processing unit, a second cost of running a second workload at each processor core of the plurality of processor cores; and
compiling, at the processing unit, a second priority queue for the plurality of processor cores based on the second cost of running the second workload at each processor core.

9. A method comprising:
compiling, at a processing unit of a processing system, a first priority queue for a plurality of processor cores based on a first cost of running a first workload at each processor core, the first cost being based on physical constraints of each processor core;
communicating to an operating system of the processing system an identifier of a first selected processor core to run the first workload based on the first priority queue; and
in response to communicating the identifier of the first selected processor core to the operating system, removing the first selected processor core from the first priority queue.

10. The method of claim 9, wherein the first cost is further based on at least one of a system usage policy, and characteristics of the first workload.

11. The method of claim 10, wherein the system usage policy is based on a trade-off between energy efficiency and performance.

12. The method of claim 10, further comprising:
updating the first cost in response to detecting a change in the system usage policy.

13. The method of claim 9, further comprising:
receiving a request from the operating system for a first processor core to run the first workload.

14. The method of claim 9, further comprising:
receiving, at the processing unit, an indication from the operating system that the first workload has completed running at the first selected processor core;
returning the first selected processor core to the first priority queue;
determining, at the processing unit, a second cost of running a second workload at each processor core of the plurality of processor cores; and
compiling, at the processing unit, a second priority queue for the plurality of processor cores based on the second cost of running the second workload at each processor core.

15. A device, comprising:
a plurality of processor cores; and
a processing unit configured to:
determine a first priority queue for the plurality of processor cores based on a first cost of running a first workload at each processor core, the first cost being based on physical constraints of each processor core;
communicate to an operating system an identifier of a first selected processor core to run the first workload based on the first priority queue; and
in response to communicating the identifier of the first selected processor core to the operating system, remove the first selected processor core from the first priority queue.

16. The device of claim 15, wherein the processing unit is further configured to write the identifier of the first selected processor core to a register configured to be read by the operating system.

17. The device of claim 15, wherein the first cost is based on a system usage policy, and characteristics of the first workload.

18. The device of claim 17, wherein the processing unit is further configured to update the first cost in response to detecting a change in the system usage policy.

19. The device of claim 15, wherein the processing unit is further configured to:
receive a request from the operating system for a first processor core to run the first workload.

20. The device of claim 19, wherein the processing unit is further configured to:
receive an indication from the operating system that first workload has completed running at the first selected processor core;
return the first selected processor core to the first priority queue;
determine a second cost of running a second workload at each processor core of the plurality of processor cores; and
determine a second priority queue for the plurality of processor cores based on the second cost of running the second workload at each processor core.

* * * * *